J. R. CABANNE.
TIRE PROTECTOR.
APPLICATION FILED APR. 17, 1916.
1,214,273.
Patented Jan. 30, 1917.
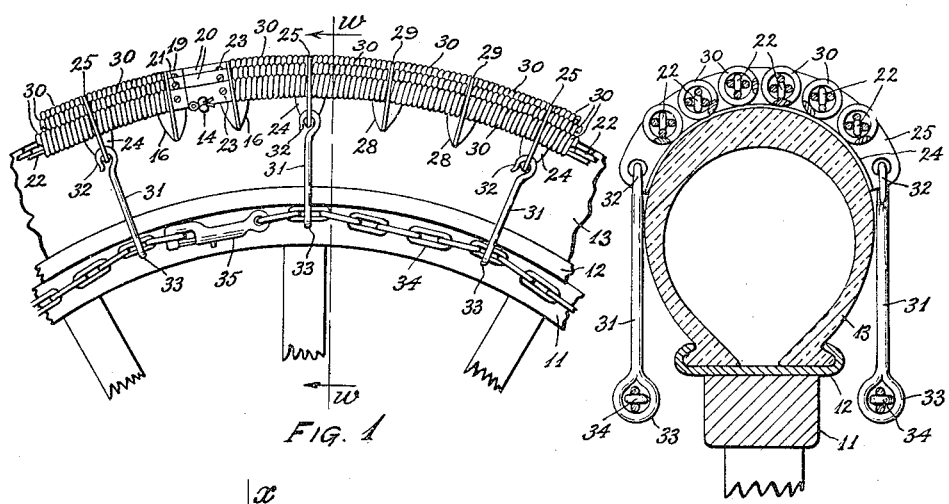
FIG. 1   FIG. 2
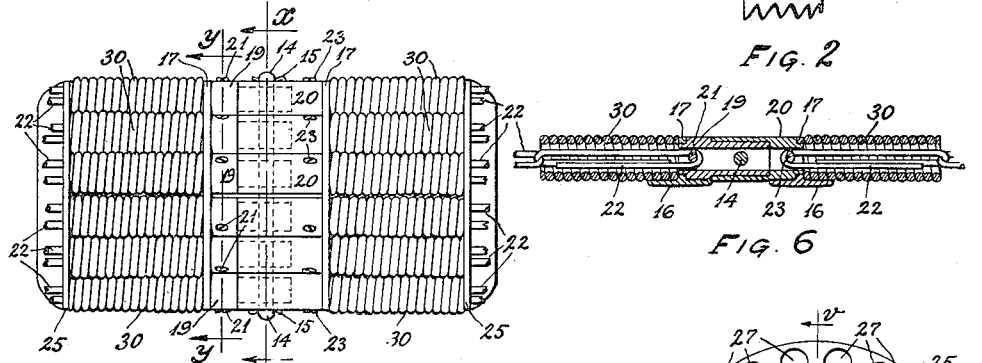
FIG. 3   FIG. 6
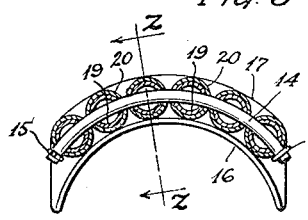   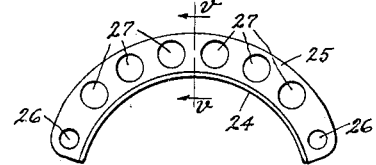
FIG. 4   FIG. 5   FIG. 7
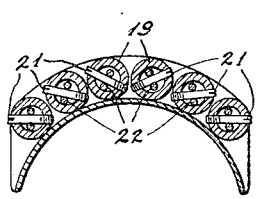   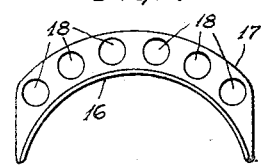
FIG. 8
WITNESS
OJohnson
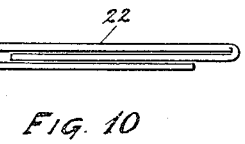
FIG. 10
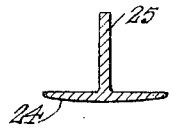
FIG. 9
INVENTOR
Julius R. Cabanne
BY
C. D. Haskins
ATTORNEY

UNITED STATES PATENT OFFICE.

JULIUS R. CABANNE, OF SEATTLE, WASHINGTON.

TIRE-PROTECTOR.

1,214,273.  Specification of Letters Patent.  Patented Jan. 30, 1917.

Application filed April 17, 1916.  Serial No. 91,811.

*To all whom it may concern:*

Be it known that I, JULIUS R. CABANNE, a citizen of the United States, residing at Seattle, in the county of King and State of Washington, have invented a certain new and useful Improvement in a Tire-Protector, of which the following is a specification.

My invention relates to improvements in tire protectors such as are employed for protecting the pneumatic tires of automobiles from contact with sharp and pointed objects disposed in the path of said tires, and the object of my invention is to provide a tire protector which can be quickly and easily disposed in its operative position on a pneumatic tire and as quickly and as easily removed therefrom, and which shall be simple in its plan of construction and be reliably effective in its function of adding to the durability of such tire, making it bullet proof and preventing its puncture by pieces of broken glass, tacks, nails and other sharp and pointed objects that may lay in its path. I accomplish this object by devices illustrated in the accompanying drawings wherein—

Figure 1 is a view in side elevation of a segment of the rim and pneumatic tire of an automobile wheel upon which is disposed a fragment of a tire protector embodying my invention; Fig. 2 is a view of the same in radial section on broken line *w, w* of Fig. 1; Fig. 3 is a view of the periphery of a segment of my tire protector with which segment is associated a separable connector which adapts said tire protector to be severed in the operation of removing it from a tire; Fig. 4 shows parts of the connector of Fig. 3 by a cross sectional view on broken line *x, x* of said Fig. 3; Fig. 5 shows other parts of same connector by a cross-sectional view on broken line *y, y* of said Fig. 3; Fig. 6 shows the segment shown in Fig. 3 by a view in longitudinal section on broken line *z, z* of Fig. 4; Figs. 7 and 8 show details of my invention by views in side elevation thereof; Fig. 9 is a view in cross-section on the broken lines *v, v* of Fig. 7; and Fig. 10 is a view in side elevation of another detail of my invention.

Referring to the drawings, throughout which like reference numerals designate like parts, 11 represents the felly of an automobile wheel which is encircled by an iron rim 12 upon which is mounted a pneumatic tire 13, only segments of which felly, rim and tire are shown.

Disposed to cover the tread portion of the tire 13 is a tire protector comprising a compound chain, preferably of steel, whose ends are separably united to form a band by means of a connector whose separable parts may be securely locked together by a curved pin 14 which is secured in its position by cotter pins 15. Each of the separable parts of said connector embodies a saddle having a curved base 16 and an integral fin 17 that projects from the convex side of said curved base 16, as more clearly shown in Figs. 7 and 9, said saddle being adapted to be seated upon the tread of the tire 13 in a position crosswise thereof with its fin 17 disposed in a plane radiating from the line of the axis of the automobile wheel.

Extending through both of the fins 17 in corresponding positions are six holes 18, as shown more clearly in Fig. 7, and within each of the holes 18 of one of said fins 17 is soldered one end of a tube, as one of the tubes 19, all of which tubes 19 project from the same side of said fin 17, as shown in Fig. 3. Each of the tubes 19, as more clearly shown in Fig. 6, is larger in external diameter in that portion adjacent to the fin 17 and is smaller in external diameter throughout the remainder of its length. Within each of the holes 18 of the other one of said fins 17 is also soldered one end of the tube, as one of the tubes 20, all of which tubes 20 project from the same side of said other one of said fins 17, as shown in Fig. 3. Each of the tubes 20, as more clearly shown in Fig. 6, in its projecting end portion, is of such internal diameter as will adapt it to receive and surround the end portion of a correspondingly disposed one of the tubes 19 to form a telescopic joint therewith. Thus all of the tubes 19 of one of the separable parts of the connector may, by one movement, be telescopically joined to all of the tubes 20, respectively, of the other one of said separable parts, and when so joined such joint may be releasably locked by the curved pin 14 which may be disposed, as more clearly shown in Fig. 4, to extend through holes drilled transversely through the telescopically disposed portions of the tubes 19 and 20, said curved pin 14 being confined in its locking position by cotter pins 15.

Extending transversely through each of the tubes 19 near its associated fin 17 is a screw, as screws 21, and connected to each of said screws 21 is one end of a chain 22 whose other end is connected to a respective one of similar screws 23 that extend transversely through respective ones of the tubes 20 at points near their associated fin 17, each of the links of each of said chains 22 being preferably of the form shown in Fig. 10, which form is such that chain 22 readily may be lengthened or shortened by adding to or taking from it one or more links without destroying or mutilating a link. Thus, the associated tubes 19 of one of the separable parts of the connector are connected with the associated tubes 20 of the other part of such connector by six parallel chains, as chains 22, that extend therebetween, and such six chains 22 are of such lengths as will adapt them to extend around the tread of the tire 13 when disposed as shown in Figs. 1 and 2.

Transversely disposed on the tread of the tire 13 at equidistant points therearound are a plurality of saddles each of which has a base 24 and a fin 25, which base 24 and fin 25 correspond to the base 16 and fin 17, respectively, of the connector in all particulars except the fin 25 is longer and its opposite end portions are provided each with a hole 26 while the holes 27 (that correspond to the holes 18) are not provided with tubes. The several chains 22 in their course around the tire 13 are disposed to pass through respective ones of the holes 27 of each of the fins 25. Also, transversely disposed on the tread of the tire 14 at equi-distant points between the adjacent ones of the several fins 25 (except the two that are adjacent to the connector) are two other saddles having bases 28 and fins 29 which exactly correspond to the bases 16 and fins 17 in all particulars except that there are no tubes associated with the holes in the fins thereof, and all of the several chains 22 are disposed to pass through respective ones of the holes in each of said fins 29. Disposed to surround each of the chains 22 are a plurality of helices 30 of steel wire, a different one of which extends throughout the distance between the adjacent ones of all the several fins 25 and 29, thus completely covering and protecting the tread portion of the tire 13, the diameter of each of said helices 30 being such that their circumferential surfaces are close to each other, as shown more clearly in Fig. 3.

In order to secure the protector in its position on the tire 13 when said tire 13 is deflated, I have provided a plurality of bars 31 each of which has a hook 32 on one of its ends and an eye 33 on its other end, and these bars 31 are hooked one into each of the holes 26 of each of the fins 25 to extend toward the center of the automobile wheel, as shown more clearly in Fig. 2. On each of opposite sides of the automobile wheel is a chain, as one of the chains 34, which is disposed to extend through all of the eyes 33 of the adjacent bars 31, and whose ends are connected together by a snap-hook 35, and whose length is such that when its ends are so connected together by said snap-hook 35 then said chain 34 will be under such strain as will cause the bars 31 to confine the protector in its position on the tread of the tire 13 in an obvious manner.

Manifestly, changes may be made in the forms, dimensions, number and arrangement of parts of my invention without departing from the spirit thereof.

What I claim is:

1. A tire protector of the class described, which embodies a plurality of saddles adapted each to be seated in a crosswise position on the tread portion of a pneumatic tire and each having an integral fin, all of which fins have a plurality of correspondingly disposed holes extending therethrough; a plurality of chains disposed parallel with each other each to extend through correspondingly disposed ones of said holes in the fins of all of said saddles, said saddles being equi-distantly spaced from each other, a plurality of helices of wire, each helix of which is disposed to surround and inclose each chain between each of adjacent ones of said saddles; whereby the saddles are held in equi-distantly spaced position, and connecting means for the ends of the chains.

2. A tire protector including a plurality of equi-distantly spaced saddles curved coincident to the curvature of the tire, linked elements extending between and through the saddles, and wire coils surrounding the linked elements with the ends thereof in engagement with the saddles.

3. A tire protector including a plurality of equi-distantly spaced saddles, linked elements extending between and through the saddles, and wire coils surrounding the linked elements with the ends thereof in engagement with the saddles.

In witness whereof I hereunto subscribe my name this 10th day of April, A. D. 1916.

JULIUS R. CABANNE.

Witnesses:
C. D. HASKINS,
O. JOHNSON.

Copies of this patent may be obtained for five cents each, by addressing the "Commissioner of Patents, Washington, D. C."